United States Patent [19]

Andreu et al.

[11] Patent Number: 4,966,956
[45] Date of Patent: Oct. 30, 1990

[54] AROMATIC THERMOTROPIC COPOLYESTERAMIDE

[75] Inventors: Enrique M. Andreu; Fernando N. Gomez; Jose L. R. Vallejo; Jose L. S. Ostariz, all of Saragossa, Spain

[73] Assignee: Cables de Comunicaciones, S.A., Saragossa, Spain

[21] Appl. No.: 384,277

[22] Filed: Jul. 24, 1989

[30] Foreign Application Priority Data

Jul. 27, 1988 [ES] Spain ................................ 8802366

[51] Int. Cl.$^5$ .......................................... C08G 63/00
[52] U.S. Cl. .................................. 528/185; 528/176; 528/183; 528/271
[58] Field of Search ................ 528/176, 183, 185, 271

[56] References Cited

U.S. PATENT DOCUMENTS

| | | | |
|---|---|---|---|
| 4,330,457 | 5/1982 | East et al. | 528/183 |
| 4,351,917 | 9/1982 | Calundann et al. | 528/183 |
| 4,351,918 | 9/1982 | Charbonneau et al. | 528/183 |
| 4,355,132 | 10/1982 | East et al. | 528/183 |
| 4,499,256 | 2/1985 | Blundell et al. | 528/183 |
| 4,567,227 | 1/1986 | Kiss | 525/425 |
| 4,839,128 | 6/1989 | Yoshino et al. | 528/183 |

FOREIGN PATENT DOCUMENTS 59-47228 3/1984 Japan .

Primary Examiner—Harold D. Anderson
Assistant Examiner—T. Mosley
Attorney, Agent, or Firm—Zarley, McKee, Thomte, Voorhees & Sease

[57] ABSTRACT

A novel copolyesteramide made up of monomeric units of formula I to IV in molar proportions of 40-60% of I, 10-20% of II, 1-12% of III and 15-30% of IV are obtained by polymerizing the corresponding monomers in molten or dissolved state, in an inert atmosphere, during a period of time between 2 and 18 hours and a temperature between 220° and 350° C.

The product is useful in the preparation of filaments with high tensile strenght and high tensile modulus, as well as for the preparation of products molded by extrusion or injection and also for the preparation of films.

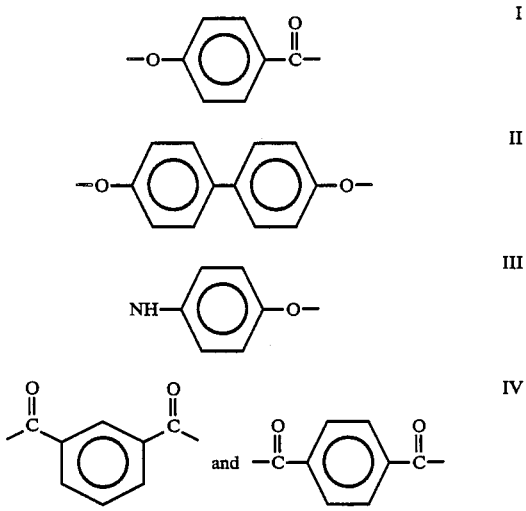

6 Claims, No Drawings

AROMATIC THERMOTROPIC COPOLYESTERAMIDE

TECHNICAL FIELD OF THE INVENTION

The present invention fits in the technical field of the preparation of aromatic thermotropic copolyesteramides that have optical anisotropy upon melting. These compounds are useful for the preparation of filaments with high tensile strenght and high tensile modulus, as well as for the preparation of products molded by extrusion or injection and also for the preparation of films.

PRIOR ART

Aromatic polyamides and polyesters which form anisotropic solutions or melts are well known for their good mechanical properties. These properties are due precisely to the macromolecular orientation that can be induced in their mesomorphous state and to the possibility of maintaining this orientation once they are transformed in usable articles or products. In general lines, aromatic thermotropic polyesters are capable of developing a mesomorphous state upon melting, while totally aromatic lyotropic polyamides develops a mesomorphous state in solutions. It can also be pointed out, in general, that mesomorphic polyamides give rise to products or articles with high mechanical properties with molecular weights lower than the ones necessary for the case of aromatic polyesters due to the effect of the intermolecular bridges of the amidic hydrogen (see, for example, M. G. Dobb, J. E. McIntyre: "Properties and Applications of Liquid Crystalline Main-chain polymers" on pp. 61-98 of ADVANCES IN POLYMER SCIENCE, Vols. 60/61, M. Gordon (Ed); Sprienger Verlag, Berlin-Heidelberg (1984).

Copolyesteramides, of which few examples are known, have properties of the two types of the polymers indicated, and, in some cases such as the present invention, they have a thermotropic nature, which makes them extremely interesting with regards their transformation.

U.S. Pat. No. 4,567,227 granted to CELANESE describes the mechanical properties of a blend of a (poly(-terphthaloyl-co-oxiphenylen-amide-co-2-oxi-6-naphthoyl)) polyesteramide and a poly(p-oxi-benzoil-co-2-oxi-6-naphthoyl))polyester.

U.S. Pat. No. 4,355,132, granted to CELANESE describes thermotropic polyesteramides made out of p-oxibenzoyl and 2,6-naphthalenedioyl units and other moities.

Japanese patent No. 59 47.229, granted to MITSUBISHI CHEMICAL describes mixtures of polyamides with thermotropic polyesteramides obtained from poly-(etileneterephthalate) and p-hydroxybenzoic acid with 5 parts (molar over the total) of p-aminobenzoic acid.

Japanese patent No. 58 89.618, granted to I.C.I. PLC describes thermotropic polyesteramides made out of 2-oxi-6-naphthoyl units in which 3-acetoxiacenatilide is used as a carrier monomer of this bond.

U.S. Pat. Nos. 4,351,917, 4,351,918 and 4,330,457 and European patent application 7715 are also related to the object of this invention.

DETAILED DESCRIPTION OF THE INVENTION

The present invention refers to the preparation of novel copolyesteramides with a molecular weight suitable for forming fibers which shows optical anistropy upon melting and which are essentially made up of units with the following structural formulae:

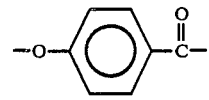

I

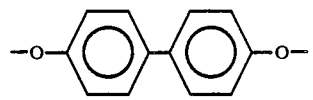

II

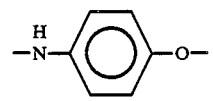

III

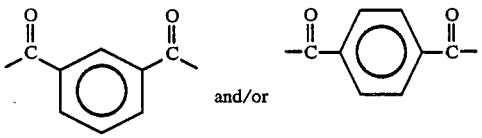

and/or

IV

These units are present in the copolyesteramides object of the invention in the following proportions

| | |
|---|---|
| Unit I | 40–60% in moles |
| Unit II | 10–20% in moles |
| Unit III | 1–12% in moles |
| Unit IV | 15–30% in moles |

In all of the cases the number of carbonyl subunits is equal to the sum of oxi and amino subunits.

The invention also includes the filaments and molded or extruded products as well as films manufactured with said copolyesteramides.

Unit I of the copolyesteramides of the invention is 4-oxibenzoyl. Unit II is 4,4'-dioxibiphenyl. Unit III is 4-aminophenoxy and Unit IV is isophthaloyl or terephthaloyl.

The suitable precursors of these units are the following:

For unit I: 4-hydroxybenzoic acid, normally 4-acetoxybenzoyc acid

For unit II: 4,4'dihydroxiybephenyl, preferably in the form of diacetate.

For unit III: p-aminophenol, preferably in the form of p-acetoxiacetanilide.

For unit IV: isophthalic and/or terephthalic acids.

The precursor reagents are generally combined in proportions which correspond with the molar proportions of the units desired in the copolyesteramides, except that a slight molar excess of the most volatile reagents can be used.

The process object of the present invention is characterized because it comprises subjecting to polymerization reaction the mixture of precursor monomers of above cited units (I) to (IV), either melted, or else dissolved in a fluid medium which does not take part in the reaction, such as for example, a medium made out of isomers of dibenzyl benzene and benzilbenzene, for example: Dowtherm or Marlotherm S (registered trade marks of Dow Chemical, USA and Hüls, A. G. West Germany). The reaction is carried out in an inert atmosphere, generally nitrogen, during a period of time between 2 and 18 hours and at a temperature between 220° and 350° C. If desired, a vacuum can be applied (0.5–1 mm Hg) in the last phase of the process to obtain copolymers with a high molecular weight. It is also possible in other cases to effect a curing in an inert atmosphere upon the polymer in powder or filament form at temperatures below the melting point.

All the polymers obtained by the process of the invention have anistropic behaviour in melting.

EMBODIMENTS OF THE INVENTION

Now some examples are given on how to put the present invention into practice. Is should be well understood that these examples have a merely illustrative and non-restrictive nature of the scope of the invention which remains exclusively delimited by the set of claims.

A series of copolyesteramides have been prepared and mechanical tests of the same have been effected in order to determine their properties. The copolyesteramides have been prepared in accordance with the following general process:

GENERAL PROCESS FOR PREPARING COPOLYESTERAMIDES.

The mixture of precursor monomers is introduced in the proportions pointed out in the following examples, in a reactor provided with a regulated heating system, a metallic bath, a condensation column, a stirring system, a nitrogen inlet and a gas outlet.

The process is carried out in a nitrogen atmosphere and with the monomers dispersed in the inert medium of reaction above mentioned. The reaction is carried out in steps: 2 h at 250° C., 2 h at 280° C., 2 h at 300° C. and finally, 12 h at 320° C. In some cases, the polymerization can be carried out for a total of 2–3 h modifying the temperature sequentially between 220° and 350° C.

Once the polymerization has been concluded the reaction mass is left to cool in a nitrogen atmosphere. Afterwards, the polymerization product is washed with acetone, is dried and ground to an adequate size, after which it is washed repeatedly with acetone. Finally, the product is subjected to prolonged drying under vacuum.

MECHANICAL TESTS AND PREPARATION OF SAMPLES FOR THE SAME

The resulting polymer from the general process described above is extruded in the form of rather cylindrical test pieces, with a thickness between 0.25 and 0.75 mm. of diameter, processing the anisotropic melted mass at the adequate temperature for each case, usually around 350° C. and cooling the extruded mass in the air.

Specifically, a piston extruder has been used which applies a constant pressure on the melted polymer at a temperature in which this has a nematic mesophase (~350°). The nematic dominius flow in these conditions orienting themselves upon passing through a die designed for this purpose. The cooling of the extruded polymer freezes this orientation, which is in which the mechanical tests described in the following examples are carried out.

Dies of 0.35, 0.5 or 0.7 mm, of inside diameter can be used with which extruded filaments with a diameter of 0.3 to 0.7 mm can be obtained. The test pieces which are used for the mechanical test are prepared from these extruded filaments. The results of these mechanical test are reflected in the examples described hereafter.

The test pieces thus prepared are separated into two groups, one for the obtainment of the mechanical original values and the other that is subjected to a thermal treatment of 72 h at 240° C. in nitrogen stream and which is also subjected to mechanical tests.

The mechanical characteristics of specimens —0.4 to 0.5 mm diameter—have been determined in all cases in an INSTRON mod. 1175 traction test apparatus, under environmental conditions of 23° C. and 50% R.H.

The traction speed in all the tests has been constant and has been 10 mm/min. The separation of the jaws in the testing machine has been 50 mm.

The results are:
TS=Tensile strenght, $Kg/cm^2$
BE=Breaking elongation, %
TM=Tensile modulus, $Kg/mm^2$ The values expressed in the examples correspond to the mathematical averages of at least five determinations.

The original average values are shown and then after the above indicated thermal treatment which are indicated with the terms "original" and "annealed" respectively.

The polymers are described, for example, as P.B.IT.T. Pa (50:15:7:18:10) indicating that they contain 50 moles % of 4-oxybenzoyl units, 15% of 4,4'-dioxibiphenyl, 7 moles % of isophthaloyl units, 18 moles of therephthaloyl units and 10 moles % of 4-aminophenoxy units. The precursors of these units are introduced in the reactor in the same molar proportions which are desired to have in the final polymer.

EXAMPLE 1

Acetoxibenzoic acid (P); 4,4'-diacetoxibiphenyl (B); terephthalic acid (T) and p-acetoxiacetanilide (PA) copolyesteramide The polymer of composition P.B.T.PA (50:15:25:10) is prepared by introducing in the reactor
22.5 g. of P (0.125 mol)
10.125 g. of B (0.0375 mol)
10.375 g. of T (0.0625 mol)
4,325 g. of PA (0.025 mol)

The polymer obtained was, washed with acetone, dried and ground. It was extruded at a temperature of 370° C. to prepare test pieces as has been indicated above. The average value of mechanical test of these specimens gave the following results:

|  | TS | BE | TM |
|---|---|---|---|
| original | 1700 | 1.2 | 1750 |
| annealed | 2150 | 1.3 | 2100 |

EXAMPLE 2

4-acetoxibenzoic acid (P), 4,4'-diacetoxibiphenyl (B) isophthalic acid (IT) and p-acetoxiacetanilide (PA) copolyesteramide The polymer of composition P.B.IT.PA (60:18:20:2) is prepared by introducing in the reactor:
27 g. of P (0.15 mol)
12.15 g. of B (0.045 mol)
8.3 g. of IT (0.05 mol)
0.965 g. of PA (0.005 mol)

The polymer obtained was acetone, dried and ground. It was extruded at 340° C. to prepare test pieces in the above cited manner. The average value of mechanical test of these specimens gave the following results:

|          | TS   | BE  | TM   |
|----------|------|-----|------|
| original | 3500 | 2.3 | 1900 |
| annealed | 3400 | 2.6 | 1800 |

EXAMPLE 3

4-acetoxibenzoic acid (P), 4,4'-diacetoxibiphenyl (B), isophthalic acid (I), terephthalic acid (T) and p-acetoxiacetanilide (PA) copolyesteramide The polymer of composition P.B.IT.T.PA (50:15:12.5:10) is prepared by introducing in the reactor:
22.5 g. of P (0.125 mol)
10.125 g. of B (0.0375 mol)
5.187 g. of IT (0.03125 mol)
5.187 g. of T (0.03125 mol)
4.825 g. of PA (0.025 mol)

The polymer obtained was washed with acetone, dried and ground. It was extruded at 360° C. to prepare test pieces in the above described manner.

|          | TS   | BE  | TM   |
|----------|------|-----|------|
| original | 4350 | 1.4 | 3250 |
| annealed | 4300 | 1.5 | 3200 |

EXAMPLE 4

4-acetoxibenzoic acid (P), 4,4'-diacetoxibiphenyl (B), isophthalic acid (IT), terephthalic acid (T) and p-acetoxiacetanilide (PA) copolyesteramide The polymer of composition P.B.IT.T.PA (50:20:12.5:12.5:5) is prepared by introducing in the reactor:
22.5 g. of P (0.125 mol)
13.5 g. of B (0.05 mol)
5.187 g. of IT (0.03125 mol)
5.187 g. of T (0.03125 mol)
2.41 g. of PA (0.0125 mol)

The polymer obtained was acetone, dried and ground. It was extruded at 340° C. to prepare test pieces in the above described manner.

|          | TS   | BE   | TM   |
|----------|------|------|------|
| original | 3500 | 1.4  | 2100 |
| annealed | 3450 | 1.45 | 2000 |

We claim:

1. An aromatic thermotropic copolyesteramide consisting essentially of monomeric units (I), (II), (III), and (IV) of the following structural formulae:

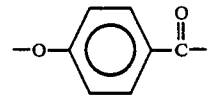 (I)

 (II)

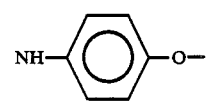 (III)

with monomeric unit IV, being a mixture of (IVa) and IVb)

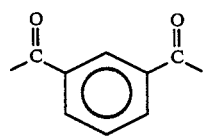 (IVa)

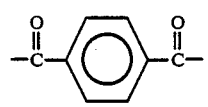 (IVb)

with the molar proportions of (I) being within the range of from 40% to 60%, the molar proportion of (II) being within the range of from 10% to 20%, the molar proportion of (III) being within the range of from 1% to 12% and the molar proportion of (IV) being within the range of 15% to 30% with at least 7% of the total mole percent of unit (IV) being (IVa).

2. The aromatic thermotropic copolyesteramide of claim 1 wherein monomeric units (IVa) and (IVb) are present in substantially equimolar quantities.

3. The aromatic thermotropic copolyesteramide of claim 1 having an orginal tensile strength of at least 1700 Kg/cm$^2$.

4. The aromatic thermotropic copolyesteramide of claim 3 having an annealed tensile strength of at least 2150 Kg/cm$^2$.

5. The aromatic thermotropic copolyesteramide of claim 1 having an original tensile modulus of at least 1750 Kg/mm$^2$.

6. The aromatic thermotropic copolyesteramide of claim 5 having an annealed tensile modulus of at least 2100 Kg/mm$^2$.

* * * * *